United States Patent [19]

Pollack

[11] Patent Number: 5,003,179
[45] Date of Patent: Mar. 26, 1991

[54] FULL COLOR UPCONVERSION DISPLAY

[75] Inventor: Slava A. Pollack, Palos Verdes Estate, Calif.

[73] Assignee: Hughes Aircraft Company, Los Angeles, Calif.

[21] Appl. No.: 517,083

[22] Filed: May 1, 1990

[51] Int. Cl.$^5$ .............................................. H04N 9/04
[52] U.S. Cl. .............................. 250/483.1; 250/486.1; 340/701; 340/702
[58] Field of Search ............... 250/458.1, 459.1, 486.1, 250/483.1, 484.1 R; 340/701, 702

[56] References Cited

U.S. PATENT DOCUMENTS

| | | | |
|---|---|---|---|
| 3,725,704 | 4/1973 | Buchanan et al. | 250/483.1 |
| 4,543,308 | 9/1985 | Schumann et al. | 250/327.2 R |
| 4,789,785 | 12/1988 | Yamazaki et al. | 250/483.1 |
| 4,812,659 | 3/1989 | Lindmayer | 250/484.1 B |
| 4,812,660 | 3/1989 | Lindmayer | 250/484.1 B |

OTHER PUBLICATIONS

Upconversion Use for Viewing and Recording Infrared Images; S. A. Pollack, D. B. Chang, I-Fu Shih, and R. Tzeng; Applied Optics/vol. 26, No. 20/Oct. 15, 1987; pp. 4400–4406.

*Primary Examiner*—Carolyn E. Fields
*Assistant Examiner*—Drew A. Dunn
*Attorney, Agent, or Firm*—Charles D. Brown; Wanda Denson-Low

[57] ABSTRACT

Full color alphanumeric or image displays are produced by upconverting near infrared radiation into visible light. The display system includes an upconverting screen including a host material doped with rare earth ions. The screen may be divided into pixels which may be slectively excited by infrared radiation to emit visible light of a desired color. An intensity-modulated infrared laser beam is scanned across the surface of the screen to selectively excite the screen pixels and produce the desired image.

14 Claims, 1 Drawing Sheet

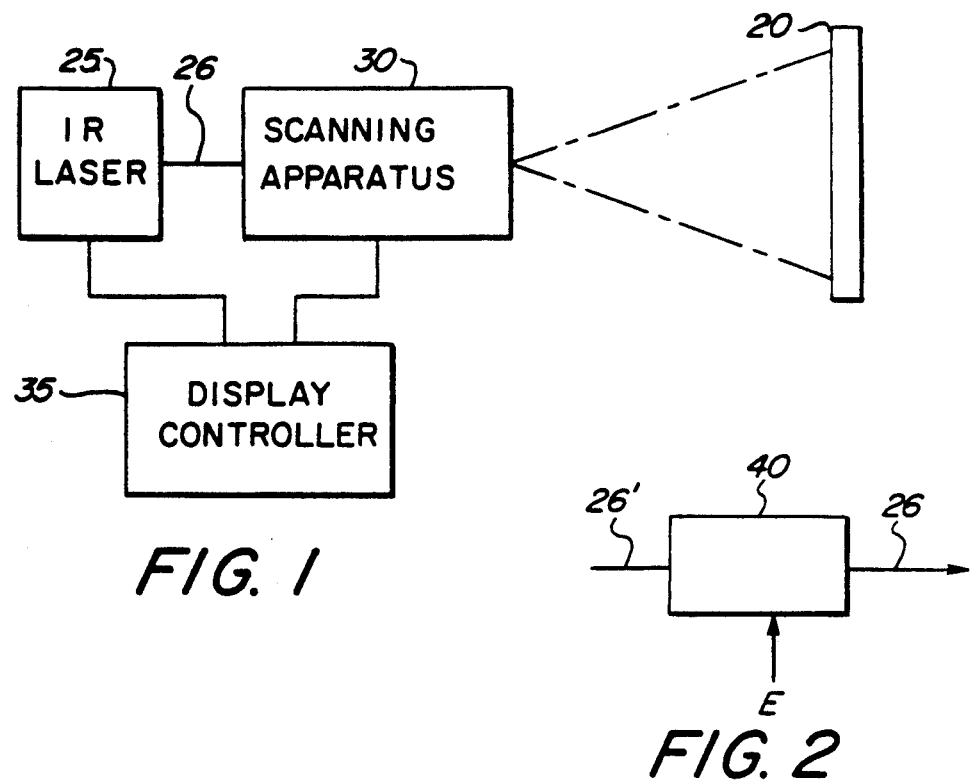
FIG. 1
FIG. 2
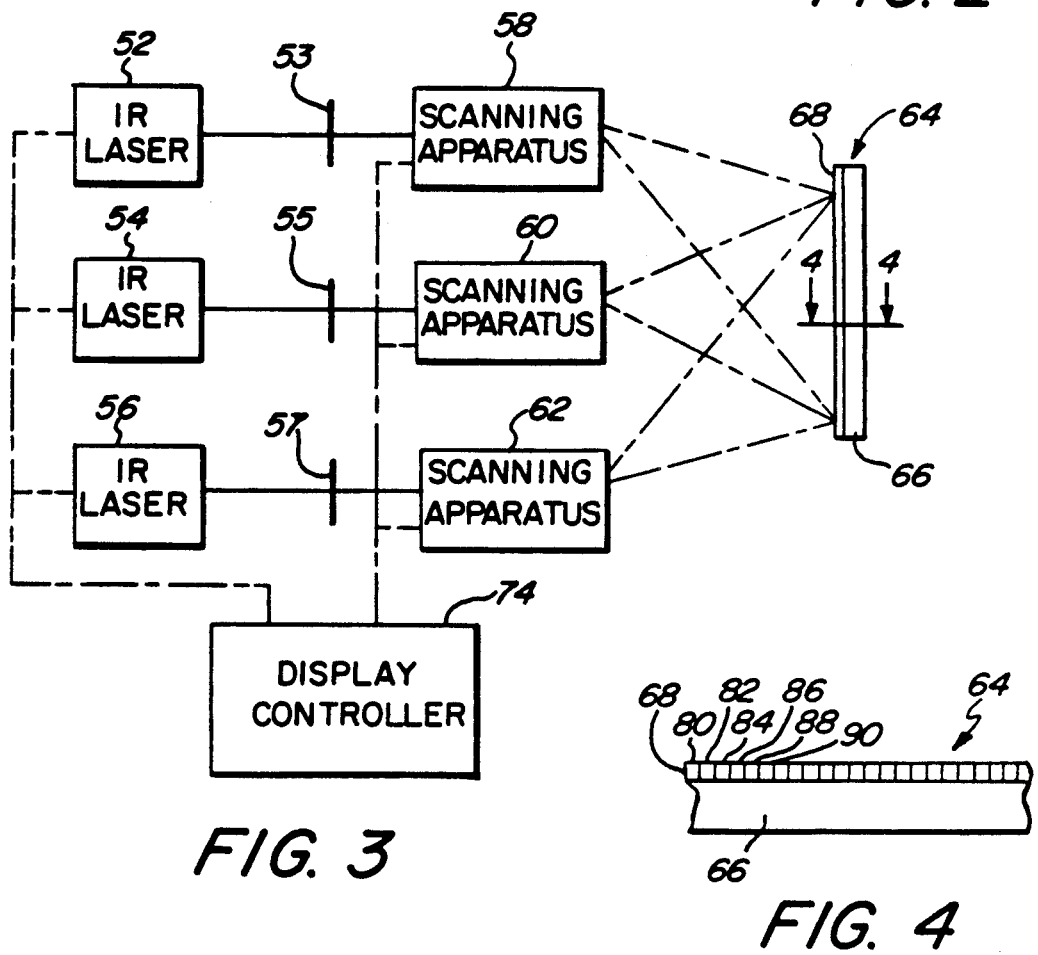
FIG. 3
FIG. 4

FULL COLOR UPCONVERSION DISPLAY

BACKGROUND OF THE INVENTION

The present invention relates to full color displays, and more particularly to color displays employing an upconversion phenomenon for upconverting incident infrared radiation into colored visible light.

Most multicolor displays are presently produced using either color LEDs or color phosphors excited by electron beams or ultraviolet light. The colors emitted by the color LED or the particular phosphor can only be changed in intensity and not in wavelength. Disadvantages of these existing displays include inefficiency of the color emitters, lack of color modulation and color tunability, and problems in application of the LED technique to generation of full color image displays. It is presently impractical to produce large color displays using LED technology.

It would therefore represent an advance in the art to provide a full color display in which the emitted colors can be modulated in wavelength, and which is suitable to providing large color image displays.

SUMMARY OF THE INVENTION

In accordance with the invention, the display system includes an upconversion element, preferably in the form of a multi-layer screen, comprising a host material which is transparent to visible light, and one or more dopant materials comprising rare earth ions. The dopants materials upconvert incident infrared radiation into visible light of color determined by the incident radiation and the dopant material and concentration. Means are provided for irradiating the upconversion element so as to define a particular image by irradiation at a desired image pixel location with infrared radiation of suitable wavelength and intensity so as to excite the upconverting element at the desired pixel location to emit light of a desired color. The irradiating means preferably comprises one or more infrared lasers and suitable scanning apparatus for scanning the laser beam across the screen surface.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 is a schematic diagram illustrating a multi-color display system embodying the present invention.

FIG. 2 illustrates one technique for modulating the intensity of the laser beam exciting the display screen of FIG. 1.

FIG. 3 is a simplified schematic diagram of an alternate embodiment of the display system, employing three modulated, scanned laser beams to excite the upconverting element.

FIG. 4 is a partial cross-section view taken along line 4—4 of FIG. 3, illustrating the display screen in further detail.

DETAILED DESCRIPTION OF THE PREFERRED EMBODIMENTS

Upconversion of infrared energy into visible radiation without assistance of auxiliary pump radiation is a rare solid state phenomenon exhibited by a few rare-earth ions, e.g., $Tm^{3+}$ and $Er^{3+}$, incorporated into various host crystals. See, e.g., "Upconversion use for viewing and recording infrared images," S. A. Pollack et al., Applied Optics, Vol. 26, No. 20, 15 October 1987, pages 4400–4406, the entire contents of which are incorporated herein by this reference.

Sometimes, $Yb^{3+}$ ions are required as a sensitizer to boost the efficiency of the upconversion process. $Yb^{3+}$-$Tm^{3+}$ systems upconvert 0.97 micron radiation into 0.47 micron blue radiation. Systems employing $Yb^{3+}$-$ER^{3+}$ ions, or simply $Er^{3+}$ ions, upconvert 0.98 and 1.5–1.6 micron radiation into 0.55 micron green radiation and 0.66 micron red radiation, respectively. It is possible to change the emission color either by changing the intensity of the exciting radiation or the excitation wavelength, thus producing color modulation and color tuning effects. Full color image displays can also be produced by scanning three modulated IR laser beams across the pixel array made of the tri-color upconverting materials.

FIG. 1 shows a simplified schematic of a display system embodying this invention. An upconverting screen 20 is selectivity illuminated by infrared radiation from a source which comprises infrared laser 25 and scanning apparatus 30. The wavelength of the radiation emitted by the laser 25 is tailored to the particular screen 20. Practical considerations such as ready availability of infrared lasers operating at 0.9–1.0 and/or 1.5–1.6 microns also bear on the wavelength selection. In one exemplary embodiment, the laser 25 comprises an infrared laser operating at 1.54 micrometers, available from Kigre, Inc., 5333 Secor Road, Toledo, Ohio 43623.

The purpose of the scanning apparatus 30 is to scan the laser beam emitted by the laser 25 across the surface of the upconverting screen 20 in a desired manner, e.g., in a raster-like manner. Apparatus suitable for scanning a laser beam in this manner is commerically available from Chesepeak Laser System, Inc., 4473 Forbes Boulevard, Lanham, Maryland 20706.

The host material of screen 20 is transparent to visible light, such as calcium fluoride ($CaF_2$), and doped by a suitable concentration of rare earth ions so as to emit visible light of a particular color when excited by infrared radiation. Typically the dopant concentration of each rare earth ion in the host material will be on the order of a few mole percent, i.e., in the range of one percent to ten mole percent. There are many suitable host materials, including zirconium fluoride glass, barium fluoride, strontium fluoride, lithium fluoride and YAG.

One preferred technique for fabricating the screen 20 is to grind the host material and rare earth material ($Er^{3+}$, $Tm^{3+}$ and perhaps $Yb^{3+}$) to a fine power, mix the power with a binder, such as optical epoxy, transparent to the exciting energy, and also transparent to the upconverted energy, and then deposit the thin emulsion on a glass substrate. The thin emulsion will form a homogenous layer of the host material and the respective dopants. This technique can be used to fabricate screens virtually unlimited in size. Another technique is to sputter the upconverting material onto a substrate. Sputtering techniques are well known in the art.

The laser 25 and scanning apparatus 30 are controlled by the display controller 35 so that the laser beam is scanned across the screen surface and its intensity modulated so as to selectively illuminated the screen to produce the desired image. For example, exciting the screen 20 with a laser beam at 0.98 micron can produce red or green upconversion light; the upconverted light changes from red to green as the intensity of the exciting beam is increased. The scanning rate is selected to provide an appropriate refresh rate which is not objectionable to the human eye.

The intensity of the exciting laser beam 26 may be modulated using conventional techniques. One such technique is to pass the laser beam 26' from the laser 25 through a Pockels cell material 40, as shown in FIG. 2. The index of refraction of the Pockels cell material 40 changes with changes to the electric field E applied to the material. The change in the index of refraction can be used to modulate the intensity of the beam 26 supplied to the scanning apparatus 30. The electric field can be modulated under the control of the display controller 35.

In another embodiment shown in FIG. 3, three infrared lasers 52, 54 and 56 with respective associated scanning apparatus 58, 60 and 62 are employed to excite the upconverting screen 64. Here, the laser 52 operates at 0.98 microns, the laser 54 at 1.5-1.6 microns, and the laser 56 at 0.97 microns. The beam from laser 52 is passed through an interference filter 53. The beam from laser 54 is passed through interference filter 55. The beam from laser 56 is passed through interference filter 57. Each of the filters 53, 55 and 57 has a narrow line width, centered on the corresponding laser wavelength, to provide filtered laser beams at the respective distinct wavelengths.

The screen 64 comprises a glass substrate 66 on which is deposited a matrix layer 68, shown in more detail in FIG. 4. The layer 68 is characterized by contiguous pixel sub-elements, each sub-element comprising a host material such as calcium fluoride which is transparent to the exciting beam and to the upconverted light energy. The host material of sub-elements 80 and 86, for example, is doped with a suitable concentration of $Yb^{3+}$ and $Er^{3+}$ ions to upconvert radiation from laser 52 into 0.66 micron red radiation. The host material for sub-elements 84 and 90 is doped with a suitable concentration of $Yb^{3+}$-$Er^3$ ions to upconvert 1.5-1.6 micron radiation from laser 54 into 0.55 micron green radiation. The host material for sub-elements 82 and 88 is doped with a suitable concentration of $Yb^{3+}$-$Tm^{3+}$ ions to upconvert radiations from laser 56 into 0.47 blue radiation. In this manner, the pixel sub-elements 80, 82 and 84 form a pixel element which can be selectively excited to produce red, green and/or blue visible light for the pixel.

It will be appreciated that the separate red, green and blue areas in the screen 64 are so small that they are not individually discernable to the human eye. Thus, as in a conventional color CRT using phosphors, a screen pixel can be selectively illuminated to excite either the red, green or blue pixel sub-elements to produce red, green or blue light, or a desired combination of these colors by selectively exciting the appropriate pixel sub-element.

The controller 74 controls the laser 52, 54 and 56 and the scanning apparatus 58, 60 and 62 so as to selectively modulate the intensity of each laser beam while it is being scanned across the surface of the screen 64 to produce the desired image. Thus, the intensity of each beam can be selectively blanked to illuminate only desired pixel areas which are to produce light of a given color.

The screen 64 can be fabricated using a three-mask sputtering technique to deposit the respective upconversion material at the particular sub-element locations on the substrate 66. A first mask, to define, e.g., the red sub-elements, is fabricated using conventional photolithographic techniques to provide a mask having openings which define the red sub-elements, including the sub-elements 80 and 86. The first mask is registered in position against the substrate 66, and the red upconversion material (the host material doped with the suitable concentration at $Yb^{3+}$ and $Er^{3+}$ ions) is sputtered onto the mask-covered substrate. When the mask is removed, only the red sub-elements have been applied. This process is repeated with second and third masks and corresponding sputtering of the blue and green upconversion materials to define the blue and green sub-elements, including sub-elements 82, 86 and 86, 90.

Alternatively, the screen of FIG. 1 can be used with the three laser arrangment of FIG. 3; i.e., a matrix-like screen is not required with the arrangement of FIG. 3.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A full color upconversion display, comprising:
   an upconversion screen, comprising a host material and one or more rare earth ion dopant materials, said one or more dopant materials being responsive to incident infrared radiation such that the upconverting screen emits visible light of a selected red, green or blue color when excited by infrared radiation of appropriate wavelength and intensity;
   means for exciting said upconversion screen in a spatially selective manner so as to define a particular color image by excitation at a desired image pixel location with infrared radiation of suitable wavelength and intensity so as to emit visible light of a desired color.

2. The display of claim 1 wherein said upconversion screen comprises a transparent substrate on which is deposited a layer of said host material and said rate earth ion dopant materials.

3. The display of claim 1 wherein said host material comprises calcium fluoride.

4. The display of claim 1 wherein said rare earth materials comprise $Er^{3+}$ and $Tm^{3+}$ ions, at a concentration of about one to ten mole percent for each rate earth material.

5. The display of claim 2 wherein said screen layer defines a matrix-like pattern of respective red, green and blue sub-elements which define screen pixels, each sub-element defined by a region of host material doped with a corresponding rare earth ion.

6. The display of claim 5 wherein said rare earth ions doping the host material in red sub-elements includes $Er^{3+}$ and $Yb^{3+}$ ions, said rare earth ions doping the host material in blue sub-elements includes $Tm^{3+}$ ions, and said rare earth ions doping the host material in green sub-elements includes $Yb^{3+}$ and $Er^+$ ions.

7. The display of claim 1 wherein said means for exciting said upconversion screen comprises an infrared laser for producing a beam of infrared laser light, a scanning apparatus for scanning the beam across the surface of the upconversion element and a display controller for modulating the intensity of the laser beam and controlling the scanning apparatus to excite said upconversion element in said spatially selective manner.

8. The display of claim 1 wherein said host material is doped with $Yb^{3+}$-$Er^{3+}$ ions in a suitable concentration to emit red visible light when excited by 1.5-1.6 micron radiation, said host material is doped with $Yb^{3+}$-$Er^{3+}$ ions in a suitable concentration so as to emit green light when excited by 0.98 micron radiation, and said host material is doped with a suitable concentration of $Yb^{3+}$-$Tm^{3+}$ ions to emit blue visible light when excited by 0.97 micron radiation.

9. The display of claim 8 wherein said means for exciting said upconversion screen comprises a first infrared laser operating at 1.5-1.6 microns, a second infrared laser operating at 0.98 microns, and a third infrared laser operating at 0.97 microns.

10. The display of claim 9 further comprising first beam scanning means for scanning said first laser beam across the surface of said screen, second beam scanning means for scanning said second laser beam across the surface of said screen, and third beam scanning means for scanning said third beam across the surfaces of said screen.

11. An upconversion screen responsive to infrared laser excitation energy to emit red-green-blue color visible display light, comprising:
 a host material transparent to the excitation energy and to visible light; and
 rare earth ion material, doping said host material in suitable concentrations so as to respond to excitation energy of appropriate infrared wavelength and intensity to upconvert the exciting energy into red, green and/or blue visible display light.

12. The upconversion screen of claim 11 wherein said host material comprises calcium fluoride.

13. The upconversion screen of claim 11 wherein said rare earth ions include $Er^{3+}$ and $Tm^{3+}$ ions, doping said host material at a concentration in the range of one to ten mole percent.

14. The upconversion screen of claim 11 wherein said host material comprise calcium fluoride, and said rare earth ions comprise $Er^{3+}$ and $Tm^{3+}$ ions.

* * * * *